United States Patent [19]
Judd et al.

[11] Patent Number: 5,602,982
[45] Date of Patent: Feb. 11, 1997

[54] UNIVERSAL AUTOMATED TRAINING AND TESTING SOFTWARE SYSTEM

[75] Inventors: Wallace P. Judd, Nevada; William L. Heinz, Oregon House, both of Calif.

[73] Assignee: Kelly Properties, Inc., Troy, Mich.

[21] Appl. No.: 311,329

[22] Filed: Sep. 23, 1994

[51] Int. Cl.⁶ .............................. G06F 3/00; G06F 17/60
[52] U.S. Cl. .................. 395/326; 395/927; 395/352; 434/118
[58] Field of Search .............................. 395/155, 161, 395/927; 434/118

[56] References Cited

U.S. PATENT DOCUMENTS

| | | | |
|---|---|---|---|
| 4,622,013 | 11/1986 | Cerchio | 434/118 |
| 4,637,797 | 6/1987 | Whitney et al. | 434/118 |
| 5,018,082 | 5/1991 | Obata et al. | 364/521 |
| 5,204,968 | 4/1993 | Parthasarathi | 395/155 X |
| 5,317,688 | 5/1994 | Watson et al. | 395/161 |
| 5,395,243 | 3/1995 | Lubin et al. | 434/118 |
| 5,421,730 | 6/1995 | Lasker, III et al. | 434/118 |
| 5,481,667 | 1/1996 | Bieniek et al. | 395/161 |
| 5,493,658 | 2/1996 | Chiang et al. | 395/155 X |
| 5,496,177 | 3/1996 | Collia et al. | 434/118 |

OTHER PUBLICATIONS

Fast Start for Lotus 1-2-3 by Wallace Judd; McGraw-Hill © 1985; p. 8.
Shelley Authoring System; ComTrain, Inc. by Wallace Judd © 1987; pp. 2–5.
101 Uses for Software Robot; Automator mi by Direct Technology Limited © 1986.
The Judd Test for 1–2–3 skills © 1991 by Mentrix Corp.
KO–PILOT for WordPerfect by Richard Getler and Chris Skelly © 1988.
Explaining "Teaching Machines" and Programming by David Cram © 1961 pp. 8 and 38.
Practical Programming by Peter Pipe © 1977 p. 6.
Klystrom Principles by Robert Kantor and Peter Pipe © 1963.

*Primary Examiner*—Raymond J. Bayerl
*Assistant Examiner*—A. Katbab
*Attorney, Agent, or Firm*—Harness, Dickey & Pierce, P.L.C.

[57] ABSTRACT

The training and testing system runs concurrently with the target software application program. The testing and training program sets up a test scenario inside the software application program and asks the user to perform a series of application functions while monitoring the user's responses. The user can select a Show-Me button to which the training and testing program responds by displaying a series of instructional messages and cursor movement and keystroke commands. These cursor movement and keystroke commands are throttled to a speed simulating the speed at which a user would execute them, so that the trainee sees the actual software application program perform the operation as if he or she had performed it.

35 Claims, 14 Drawing Sheets

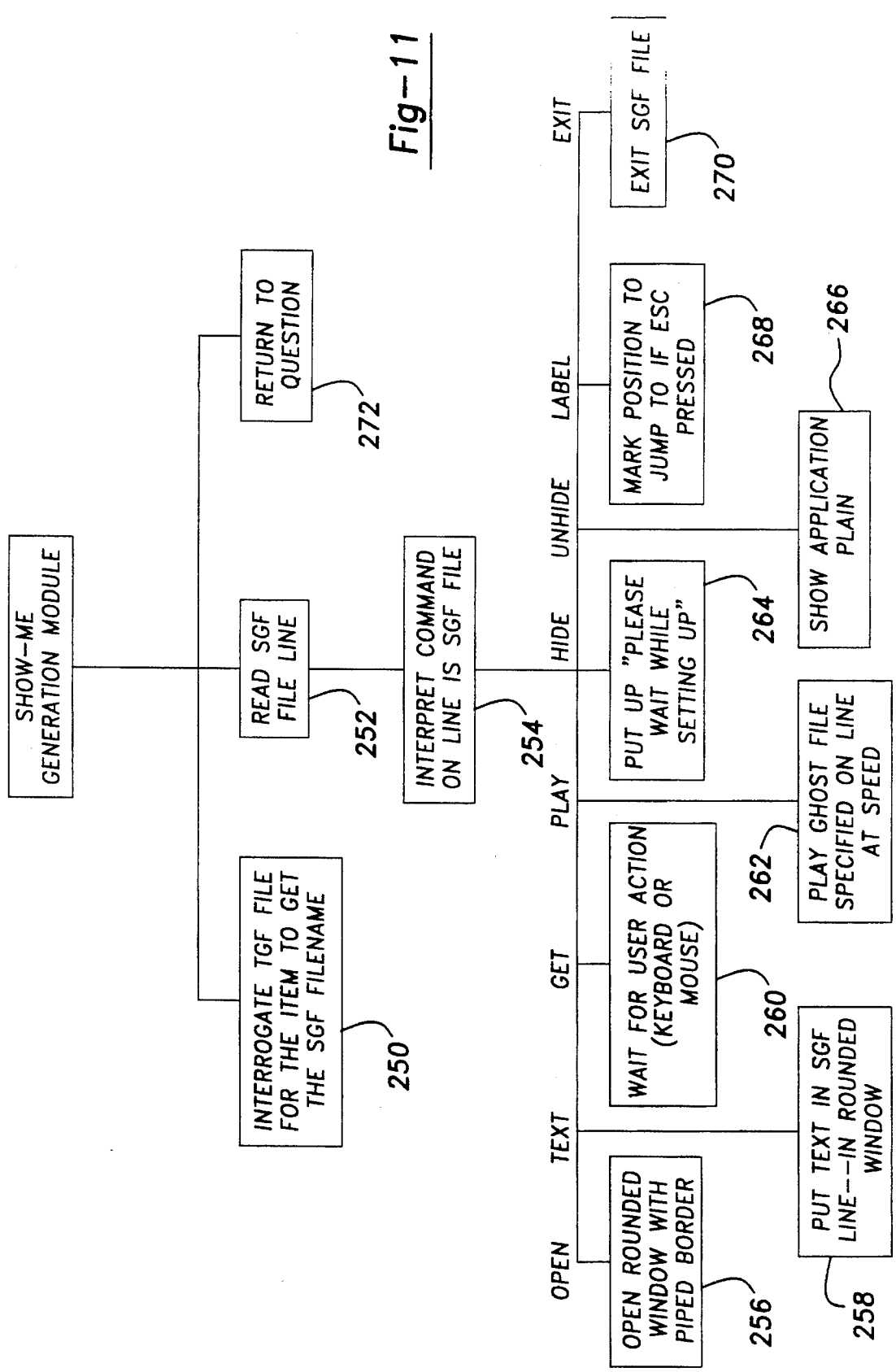

UNIVERSAL AUTOMATED TRAINING AND TESTING SOFTWARE SYSTEM

BACKGROUND AND SUMMARY OF THE INVENTION

The present invention relates generally to software training systems. More particularly, the invention relates to a universal software training and testing system which identifies the trainee's weaknesses and provides step-by-step instructions, complete with graphical display that demonstrates the manner an experienced user will execute cursor movements and operating steps to perform a software function in actual use of the program.

There is a large number of computer software applications in popular use today. Examples include word processing programs, spreadsheet programs, drawing programs, financial accounting programs, and the like. Many of these programs are mass marketed and are frequently updated, at least once a year.

This presents a practical problem for many users. Learning a software application takes time. Some users are reluctant to upgrade to a new software application version, if it will mean having to relearn what they already know how to do. The motivation for upgrading to a new version is usually to gain added features. Regardless of the motivation, however, when a user upgrades to a new version of a software application, he or she typically must learn the new features as well as any changes made to existing features. While users' manuals and aftermarket books can help the user get over the learning curve, many users do not enjoy looking up things in books. Indeed, some users are loath to open a software users' manual.

Grappling with the training issue is particularly important for the temporary service industry. Temporary service agencies provide employees on a part-time basis to businesses which need temporary help. The temporary employee needs to be trained in advance, so that he or she is fluent in the software applications used by the temporary employer. The Applicant's Assignee has done a considerable amount of work in this area and has discovered that automated training and testing systems can be more effective for training its employees for the tasks they will encounter on the job. In addition, automated systems can also provide a testing function. The Users' skills can be evaluated and a report generated, for use in selecting persons who best qualify for a particular job assignment.

Many conventional automated training systems are nothing more than simulators. These are applications which simulate the user interface and software application functions of a given software application program. Being a simulation, however, the actual software application is not actually being run. Using a simulation training system, the trainee is taken through a series of tests, and the training program records the results. Some simulation programs also provide a few preplanned demonstrations on particular software application features. For example, a preplanned demonstration might show the user how to create a chart in a spreadsheet program. The demonstration, however, is not an actual demonstration of the software application in execution, but rather merely a series of graphical displays designed to give the appearance of the software application in actual operation.

One problem with simulation training programs is that they are difficult to keep up to date. As noted above, mass marketed software applications are frequently updated. This means that each time that the application is updated, a new simulation program may need to be constructed. The problem is further heightened by the occasional interim release upgrade, distributed by the software application manufacturer to correct a bug. Due to the time required to construct accurate simulation programs, it is not often practical to maintain the simulation program in synchronization with the software application which it is designed to mimic.

Additionally, many popular application programs, such as word processing programs, have evolved in such a way as to enable a user to perform a given task in a variety of different ways. However, it is impractical for simulation training programs to accurately simulate every alternative capability of such application programs Thus, for example, even though a particular function can be performed with an application program in any of five different ways, the simulation program may only simulate one or two. Consequently, the proficiency skills of a user that has learned to perform this function in a way that is different from that selected by the simulation program will be incorrectly evaluated.

Although not designed for training, some software applications are provided with a "wizard" feature that can assist a user in performing a function that the user is unfamiliar with. The wizard asks the user a series of questions about the desired end result (e.g., what the spreadsheet chart should look like), and then the wizard performs the necessary operations, typically instantaneously. Although the wizard helps the user get the job done, it does not teach the user how to perform the necessary tasks, since it performs the tasks for the user at high speed. Thus, rather than learning how to use the various features of the software application, the user simply learns to turn to the wizard in all cases. Accordingly, the wizard feature is not suitable for testing and training a user in the operation of a software application.

The present invention provides a universal automated training and testing system that overcomes the deficiencies of simulation training systems. Unlike conventional training and testing systems, the present invention poses a question to the trainee and gives the trainee an opportunity to answer the question. In this way, the training and testing system puts the trainee in the proper frame of mind to learn. The training and testing system then checks the trainee's answer and gives the trainee a "show-me" option that will display instructional text combined with on screen cursor movements to simulate the way an experienced user would answer the posed question. Preferably the show-me feature presents an alternating sequence of textual instructions and cursor movements, so that the trainee learns by both reading and watching.

Being a universal system, the training and testing system of the invention is readily adapted to virtually any software application. In contrast with simulation training systems, the present universal automated training and testing system is adapted to a new software application quite easily and economically. This is in part due to the fact that the system of the invention runs concurrently with the software application which it is designed to test and train. Unlike the wizard feature of a software application, the training and testing system of the invention shows the user how to perform application functions by breaking those functions into bite-sized steps. The training and testing system actually controls the user interface of the software application causing it to perform the desired function step-by-step. The training and testing system also controls the user interface of the software application to supply actual mouse movement and keyboard entry information, at a speed which simulates the manner a user would execute those cursor movement and keyboard operations. In this way, the training and testing system takes control of the software application and performs the proper sequence of operations right before the user's eyes.

According to one aspect of the invention, the universal automated training and testing system of the invention provides a much improved way for training a user to use a software application. Although the invention can be used to test and train users to operate software applications employing only keyboard entry devices, the invention also will test and train in the use of software applications employing a pointing device, such as a mouse, for producing a device-directed screen cursor. The automated training and testing system will test the user's skills in the software application and provide a "show-me" capability to assist the trainee in learning a new function once the program has identified a feature which the trainee is unsure of.

The training and testing system of the invention comprises a run-time module adapted for running concurrently and interactively with the software application. A test question generator is associated with the run-time module. It generates a plurality of textually displayed questions designed to test the user's skills in using different aspects of the software application. A Show-Me button, associated with the run-time module and also with the test question generator, is actuable by the user to generate a trigger event within the run-time module. The run-time module includes a Show-Me display generator that is responsive to the trigger event. The display generator produces the following messages:

(a) A textually displayed instructional message, keyed to the question being displayed, for informing the user on how to perform a particular task with the application program; and (b) a cursor movement message.

The cursor movement message causes the screen cursor to move to predetermined locations on the display screen and further causes the application program to execute at least one operating step. In this way, the run-time module simulates the manner a user would execute the cursor movements and operating steps in actual use of the application program.

For a more complete understanding of the invention, its objects, and advantages, reference may be had to the following specification and to the accompanying drawings.

BRIEF DESCRIPTION OF THE DRAWINGS

FIG. 11 is a detailed structure diagram of the Show-Me feature; and

DESCRIPTION OF THE PREFERRED EMBODIMENT

To give the reader an overview of the presently preferred embodiment, reference will first be made to a series of exemplary user interface screens. These screens illustrate what the user sees when participating in testing and training using the system. It will, of course, be understood that the present invention is not restricted to the particular user interfaces illustrated. Rather, any suitable user interface can be employed.

Figures 1, 2:
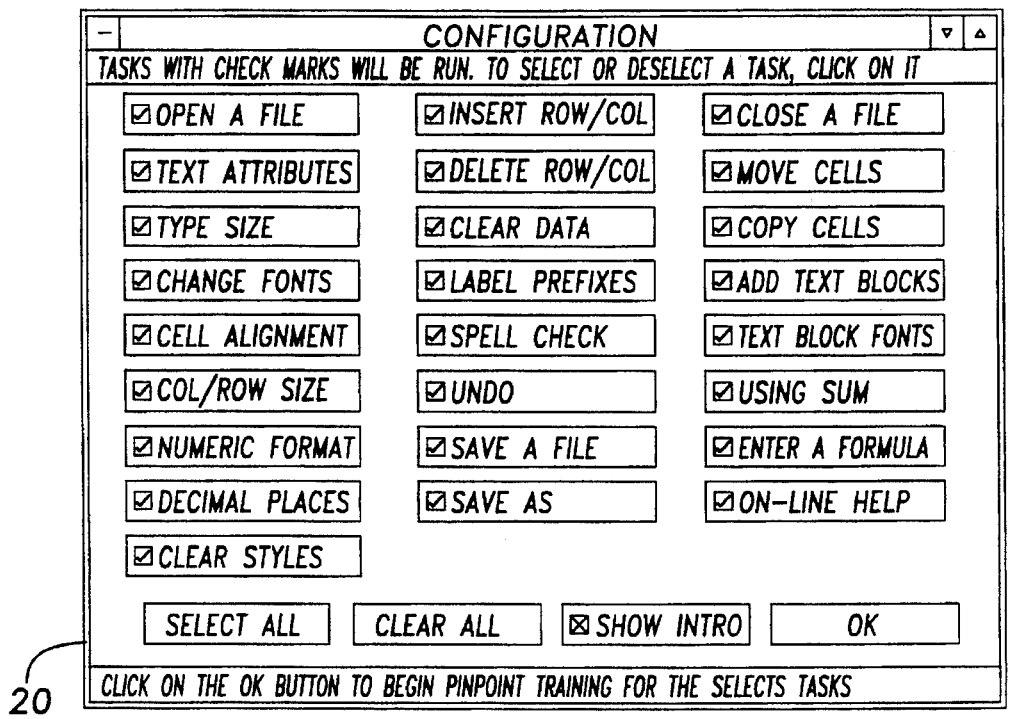
FIG. 1 is a user interface diagram depicting the configuration screen of the presently preferred embodiment.
FIG. 2 is a user interface diagram depicting a sample task being performed.

Referring to FIG. 1, the initial configuration screen is illustrated in window 20. Window 20 includes a plurality of check boxes through which the user can select which software application functions he or she wishes to explore. These check boxes are selected and deselected by selective mouse clicks. The actual items listed on the configuration screen correspond to software application functions, specific to a given application program.

After the user has selected the desired functions, the OK button is clicked, whereupon the testing sequence begins. FIG. 2 illustrates an example of a testing sequence. In the illustrated example, the test sequence or test part asks the user through pop-up window 22 to use the AutoSum feature to add the numbers in column B and to put the answer in cell B10. Note that this example corresponds to a test suitable for a spreadsheet program such as Microsoft Excel. Although the user is interacting with the testing and training system of the invention, the Microsoft Excel application program (or any target application program) is actually running concurrently with the testing and training program. Thus, in FIG. 2 an actual Microsoft Excel spreadsheet is depicted. The particular data reflected in that spreadsheet corresponds to actual data that is read into the Microsoft Excel spreadsheet program before the testing and training sequence begins. The testing and training program automatically causes this data to be loaded prior to testing. While a Microsoft Excel spreadsheet example is shown here, it will be understood that the invention works equally well with other software application programs.

Appearing beneath the software application program screen 24 is the testing and training screen 26 of the present invention. Screen 26 includes Show-Me button 28, Start-Over button 30, Instruction button 32, Done button 34, Back button 36, and Exit button 38. The testing and training screen 26 also includes an on-line summary field 40 which provides a summary instruction for the task to be completed. This instruction remains visible throughout the main task. The screen also includes a completion gauge 42 which shows the user approximately how far along he or she is in the training session. The Show-Me button 28 gives the user a step-by-step demonstration of how to complete the assigned task. The Start-Over button resets the task and the task time (used to measure the user's performance). The Instruction button repeats the main instructions that appear when the program is first loaded. The Done button is pressed by the user when the task being tested is finished. The Back button returns the user to the previously configured task. The Exit button takes the user to a summary report, where the user's performance statistics are displayed and where the user can then exit the testing and training program.

Figure 3A:
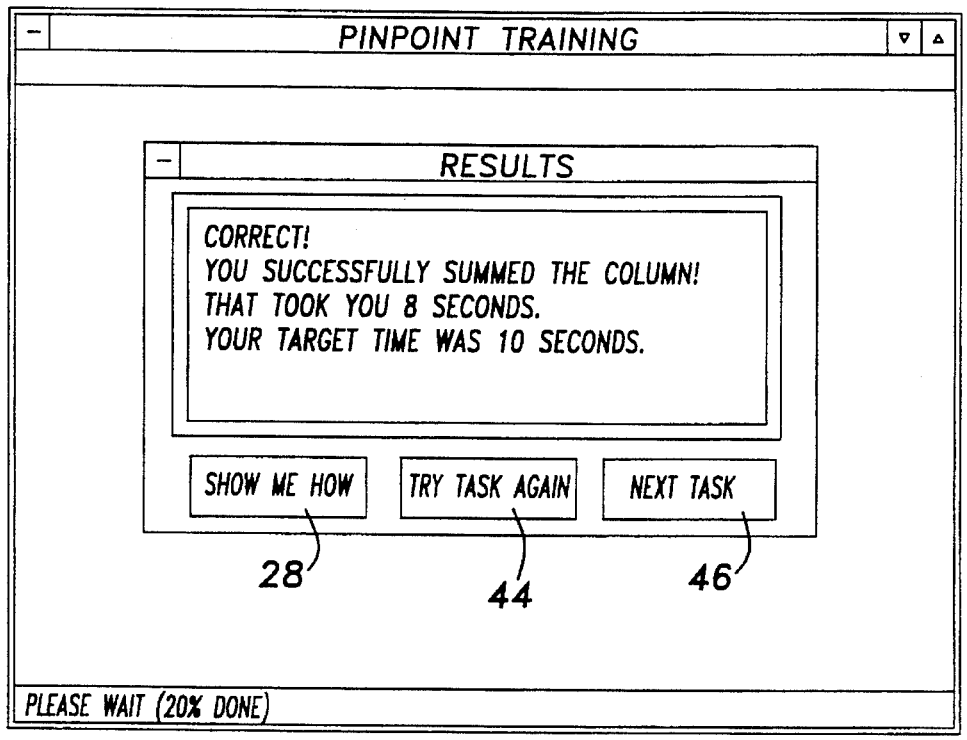
FIGS. 3A and 3B (collectively FIG. 3) is a user interface diagram illustrating a task feedback message being presented to the user.
Figure 3B:
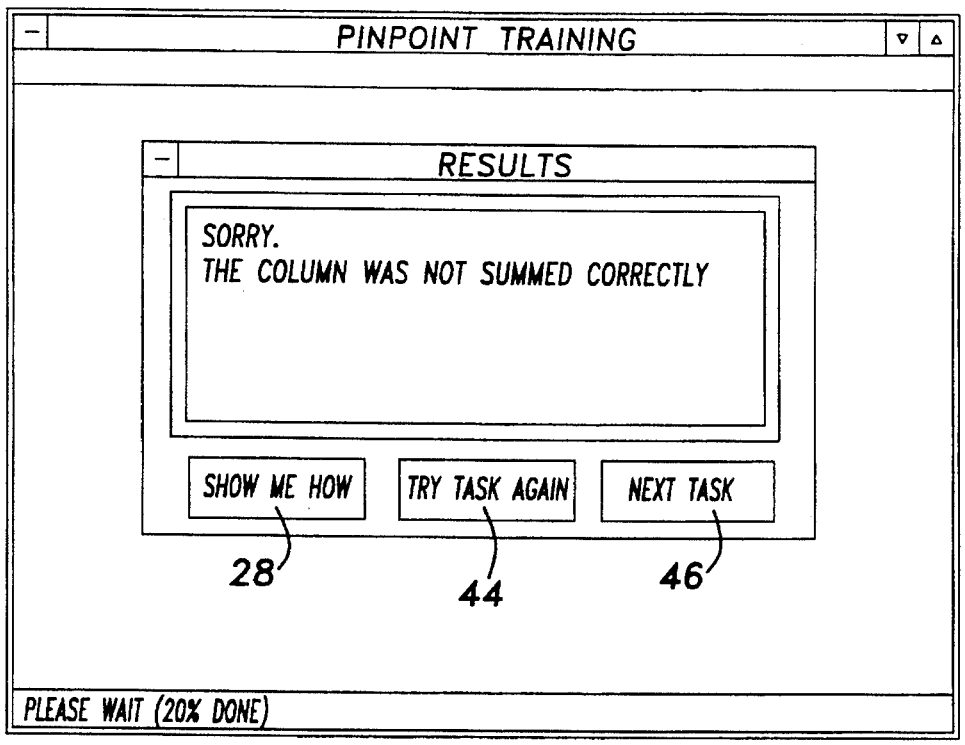
Figure 4A:
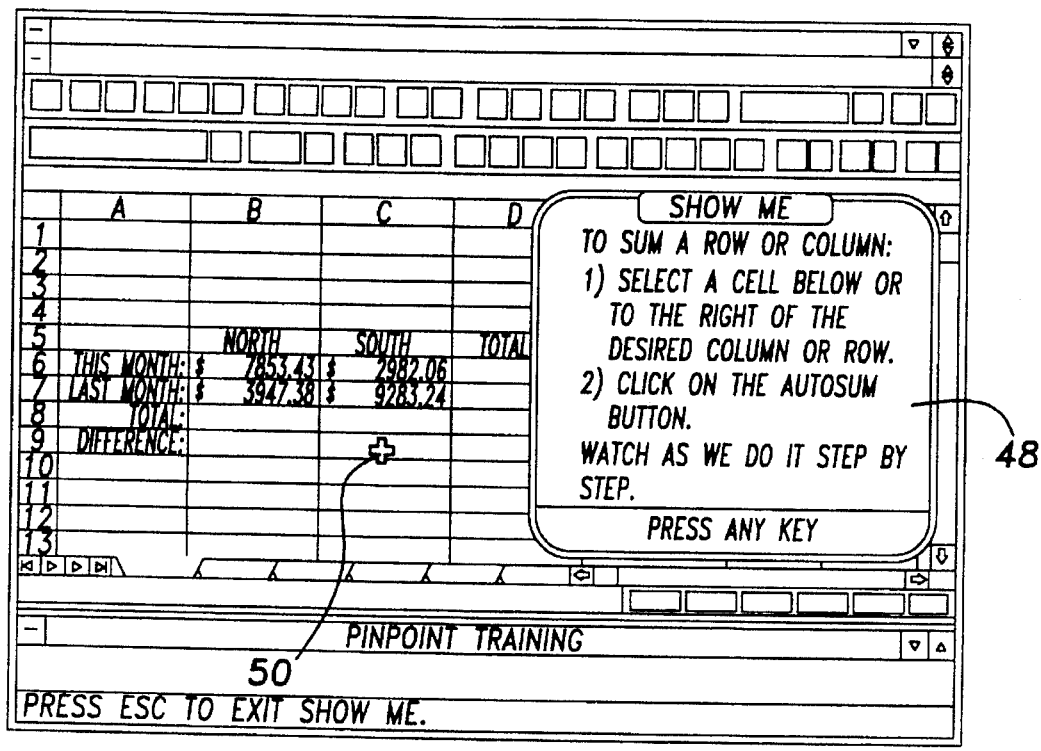
FIG. 4A–4H (collectively referred to as FIG. 4) is a user interface diagram depicting the Show-Me operation.
Figure 4B:
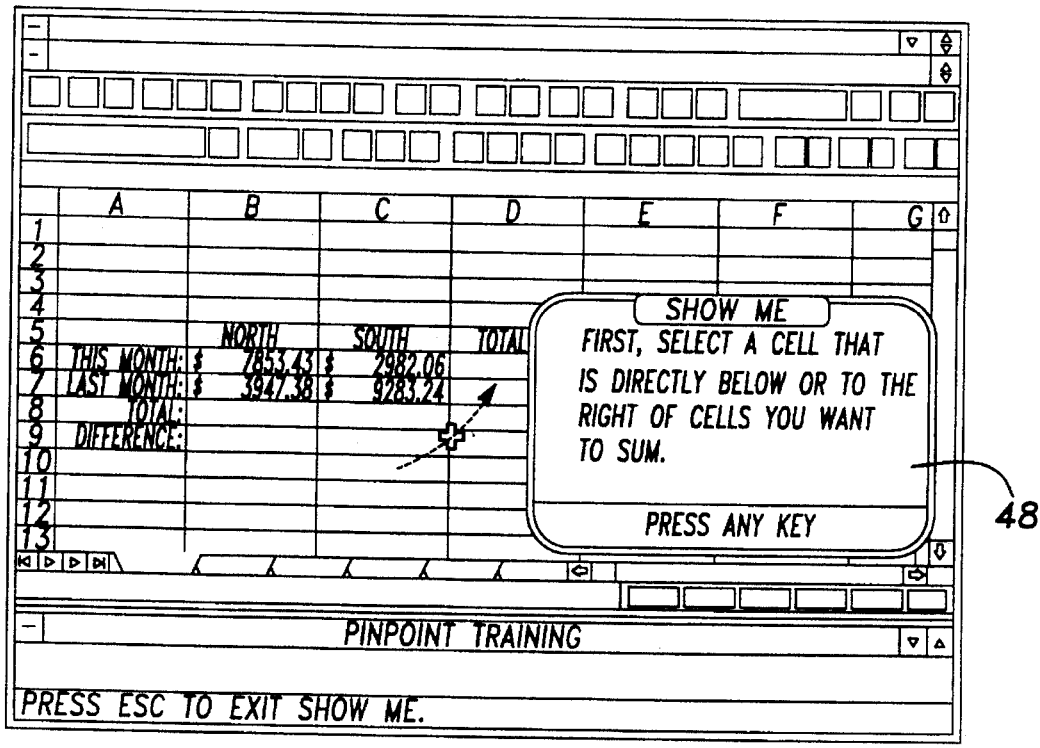
Figure 4C:
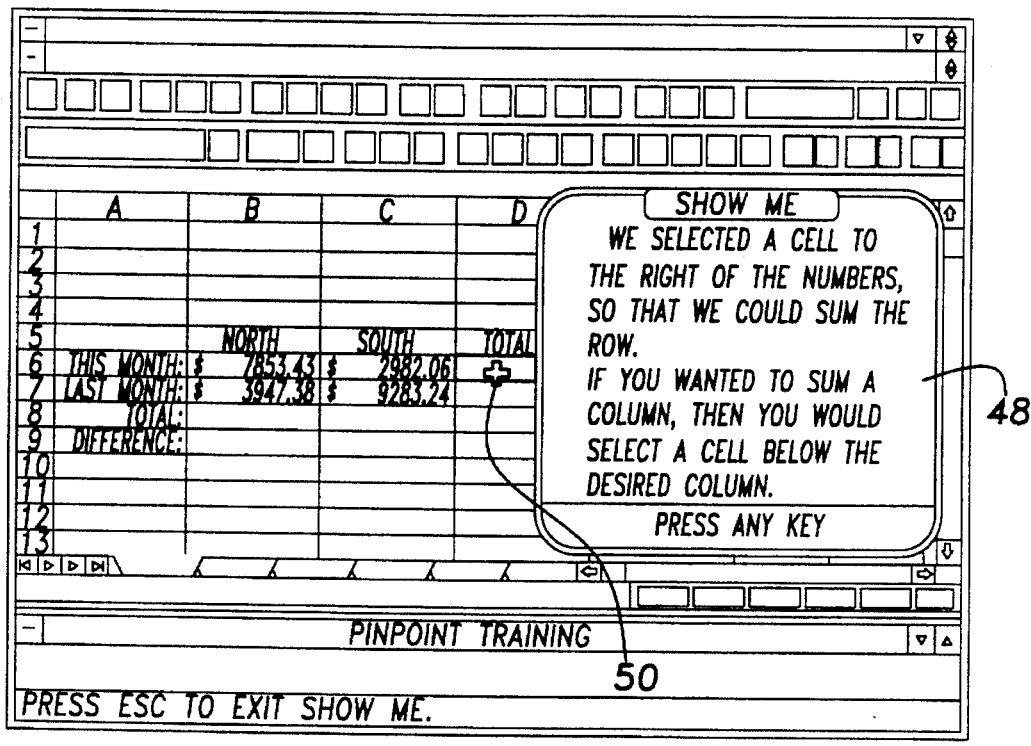
Figure 4D:
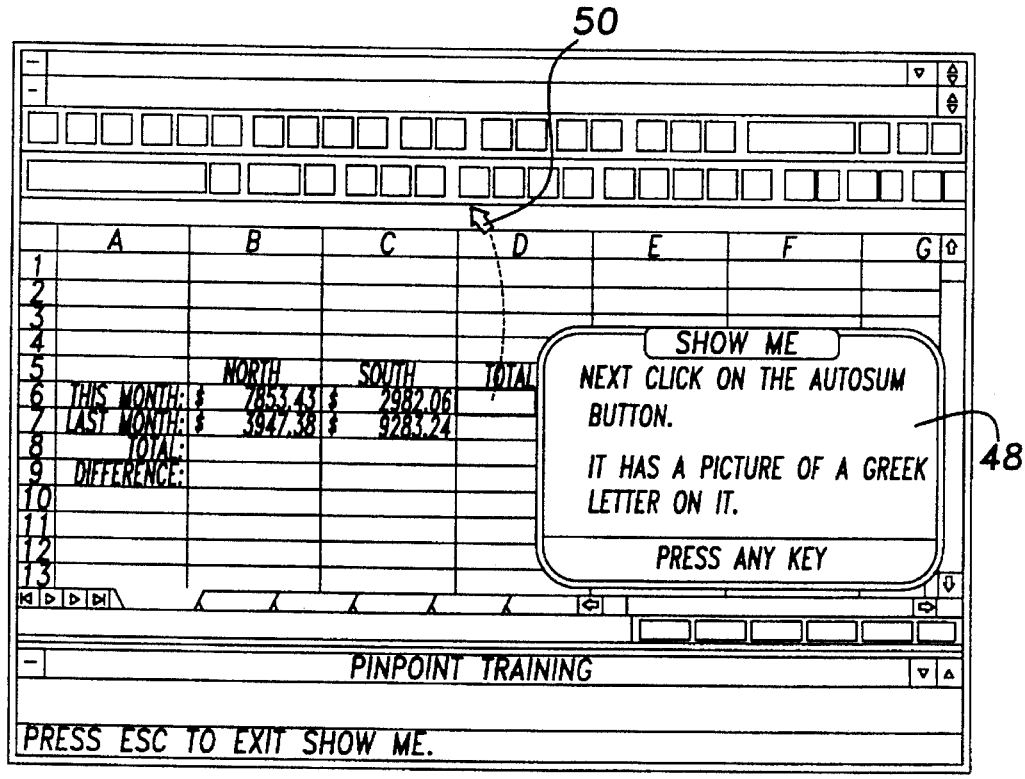
Figure 4E:
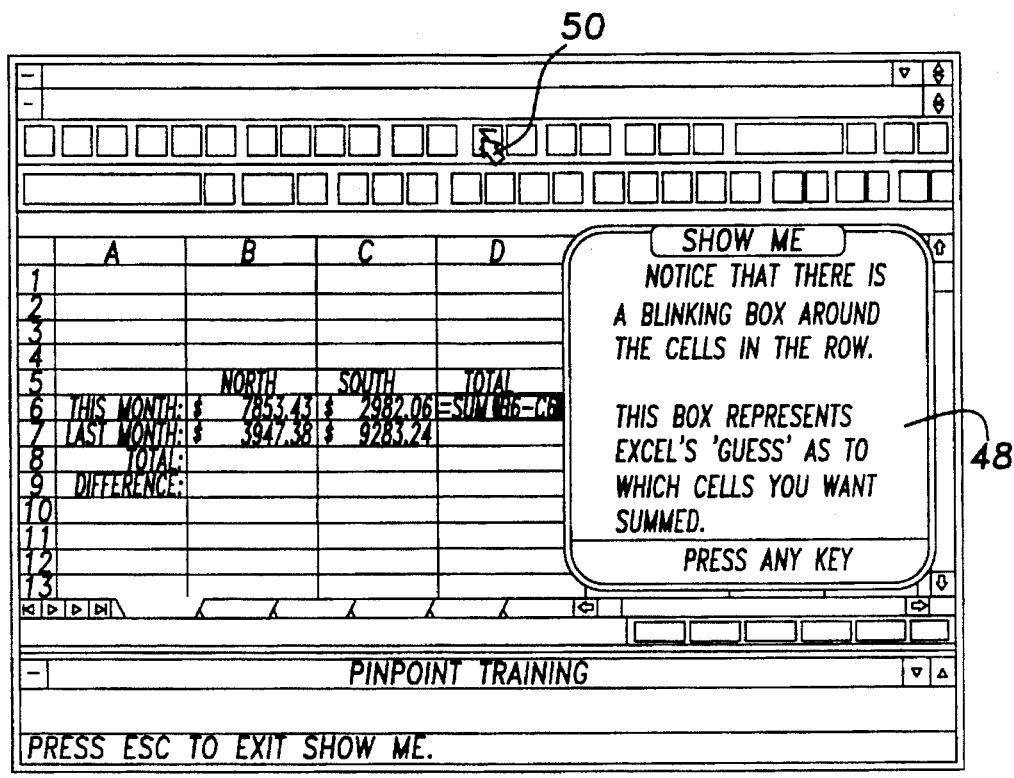
Figure 4F:
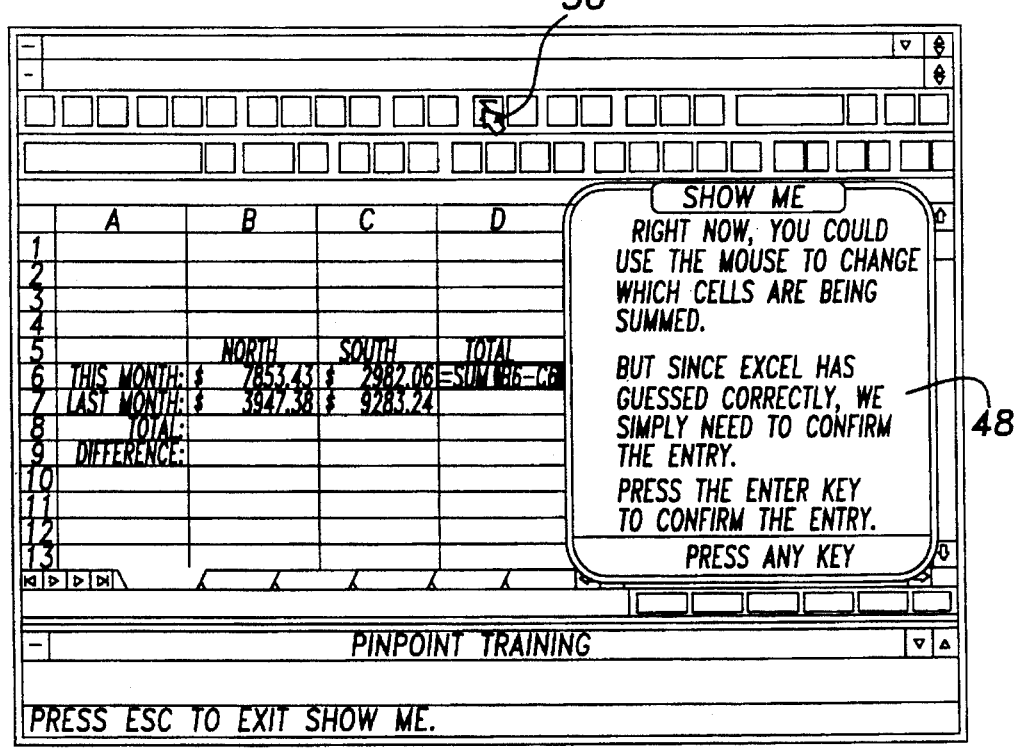
Figure 4G:
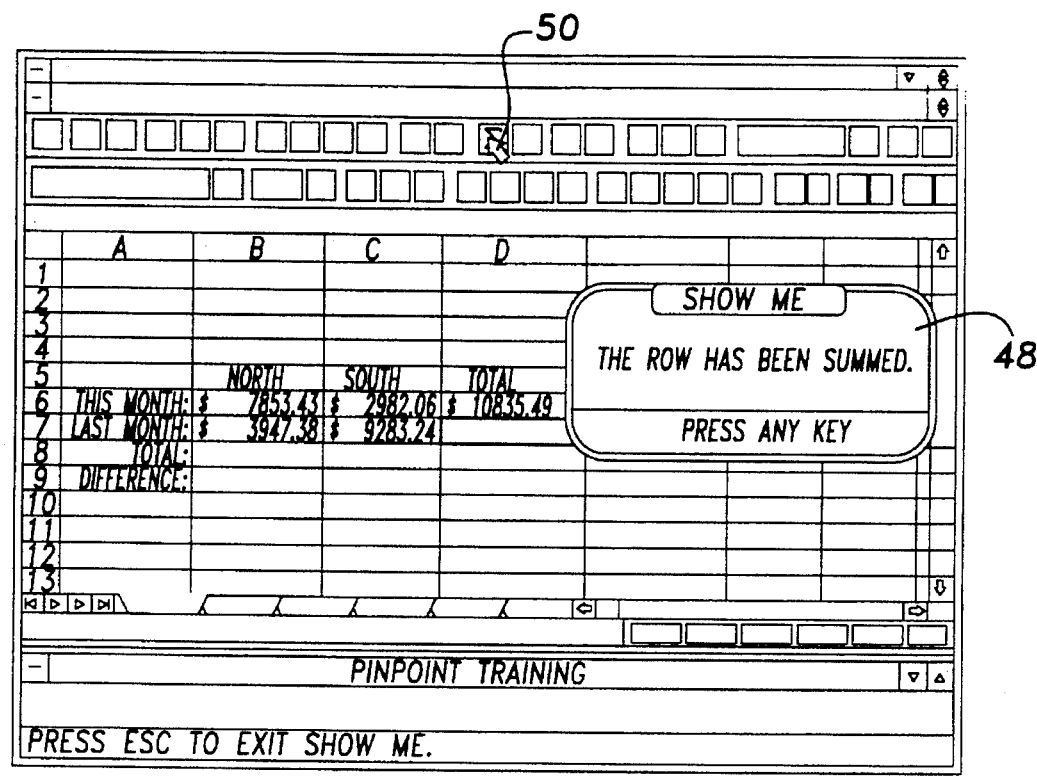
Figure 4H:
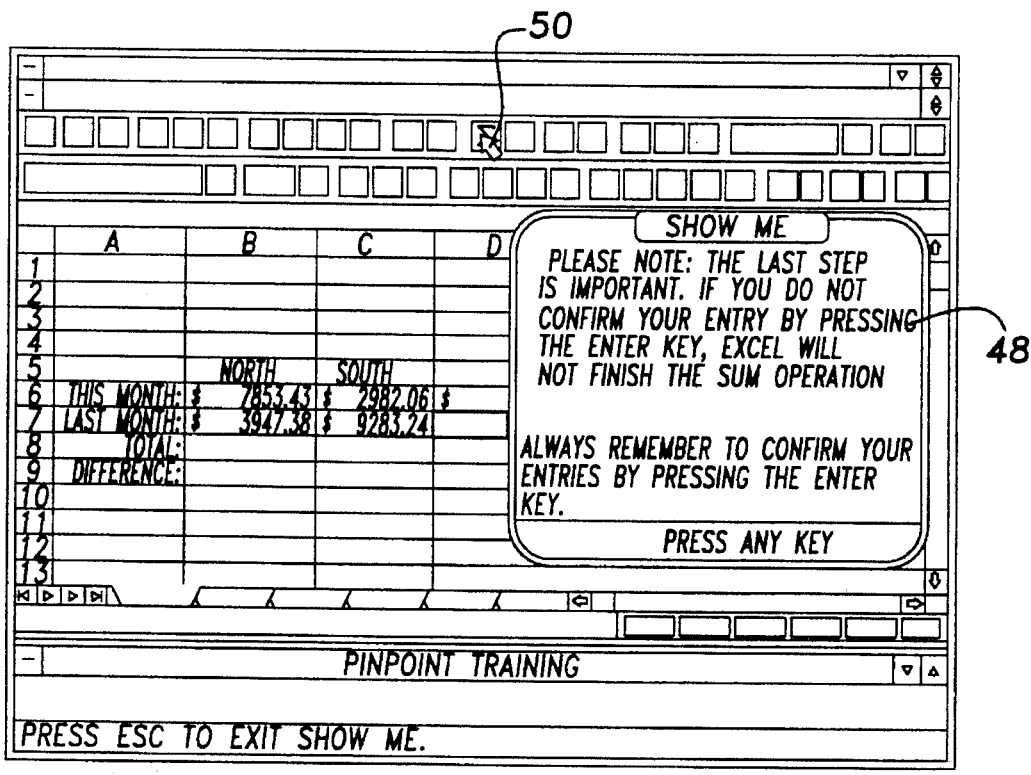

When the user has performed the assigned task and has checked the Done button, immediate feedback is displayed through task feedback message screens. Examples of these are shown in FIGS. 3A and 3B. In FIG. 3A a message is displayed that the user's performance was correct and that the user took 8 seconds to perform the task. The display also indicates that the target-time for that task was 10 seconds. In FIG. 3B the user receives a message that he or she did not perform the task correctly. As illustrated, both of these message screens include an arrangement of buttons which can be selected to Show-Me How (button 28), Try Task Again (button 44) and Next Task (button 46). Note that when the correct answer has been given (FIG. 3A) the Next Task (button 46) is highlighted, indicating that it is the default operation. On the other hand, if the incorrect answer has been given (FIG. 3B) the Show-Me How (button 28) is highlighted, making it the default operation. Significantly, because the testing and training program is running concurrently with the application program, the testing and training program will accept as a correct answer any procedure for implementing the requested task that the application program will accept. Consequently, erroneous evaluation of the trainee's proficiency with the software application program is avoided.

FIGS. 4A–4H give an example of the Show-Me or Show-Me How feature of the invention. This series of screens is an example of the presentation of material that might be displayed to respond to the test question or test part shown in window 22 of FIG. 2. Note that in each of the Show-Me screens there is a Show-Me message box 48 in which textually displayed instructional messages are provided. As illustrated, these messages are keyed to or correspond to the question that was displayed in window 22 of FIG. 2. By pressing any key on the keyboard, the user can cause the Show-Me system to step through the series of displays illustrated in FIGS. 4A–4H, respectively. Preferably, the first Show-Me message (FIG. 4A) gives an overview of the entire procedure that will be performed. In this way, if the user is basically familiar with the information, but has simply forgotten the details, this first screen provides the information needed. The user can exit the Show-Me function at any time by pressing the escape key on the keyboard.

In addition to the textually displayed instructional messages, the Show-Me system also provides cursor movement messages which cause the screen cursor to move to predetermined locations within the software application window. These cursor movement messages also produce the necessary mouse key-click messages to cause the application program to execute at least one of the operating steps associated with the part being tested. These cursor movement messages are controlled or throttled by an appropriate timing loop or timing function, so that the cursor movement simulates the manner in which a user would actually execute the correct cursor movement and operating steps. Details on how to implement this are found in *Windows 3: A Developers Guide* by Jeffrey Richter (M&T Publishing). The program ECHO.C appearing at page 450, listing 6–13 of this reference, illustrates the technique.

Exemplary cursor movement is illustrated in a series of static positions in FIGS. 4A–4H. Accordingly, in FIGS. 4A–4H the cursor 50 is shown with a dashed trailing line to indicate cursor movement. It will be understood that the appearance of the cursor changes, depending on its position on the software application screen. This is indicative of the fact that the software application is actually running concurrently with the testing and training program.

Figure 5:
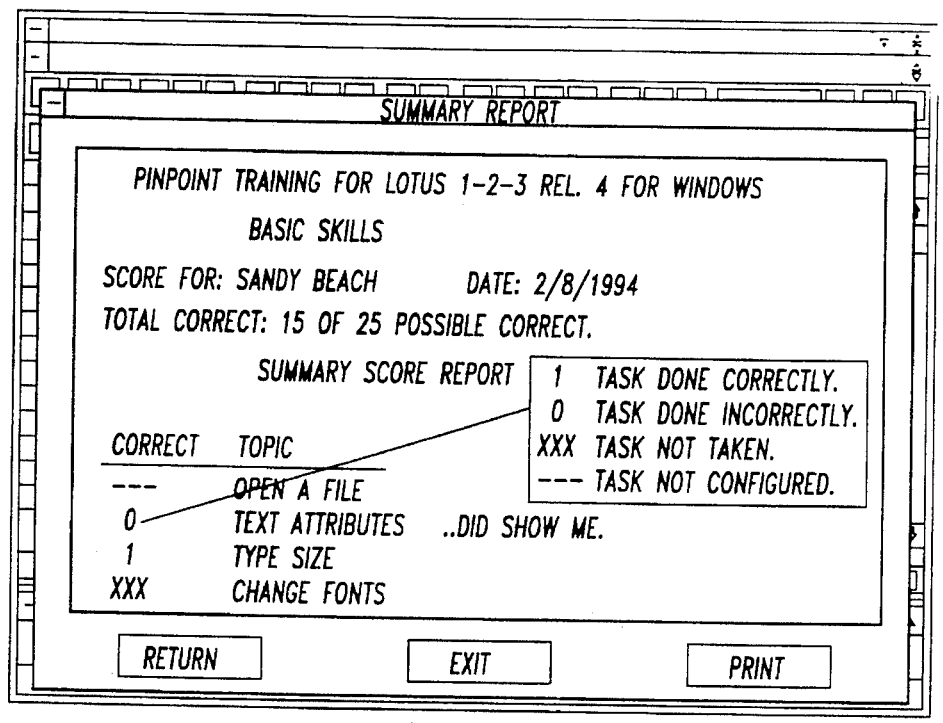
FIG. 5 is a user interface diagram depicting a summary report generated by the system.

Once the user has completed all of the test parts for the selected testing and training session, the program automatically goes to the Summary Report screen illustrated in FIG. 5. Alternatively, the user can press the Exit button 38 which calls up the Summary Report screen illustrated in FIG. 5. The Summary Report identifies those tasks which were performed correctly, those tasks which were performed incorrectly and those tasks which were skipped. The report also shows those tasks that were not configured (i.e., not set up for part of the training session). The report also illustrates which tasks the user selected the Show-Me option. In the illustration in FIG. 5, the report shows that the user selected the Show-Me option on the Text Attributes topic. The Summary Report screen includes a Return button that will take the user back to the initial configuration screen (FIG. 1). The Exit button closes the training and testing program, closing all open files. The Print button causes the testing and training program to deliver a hard copy of the displayed report.

Figure 6:
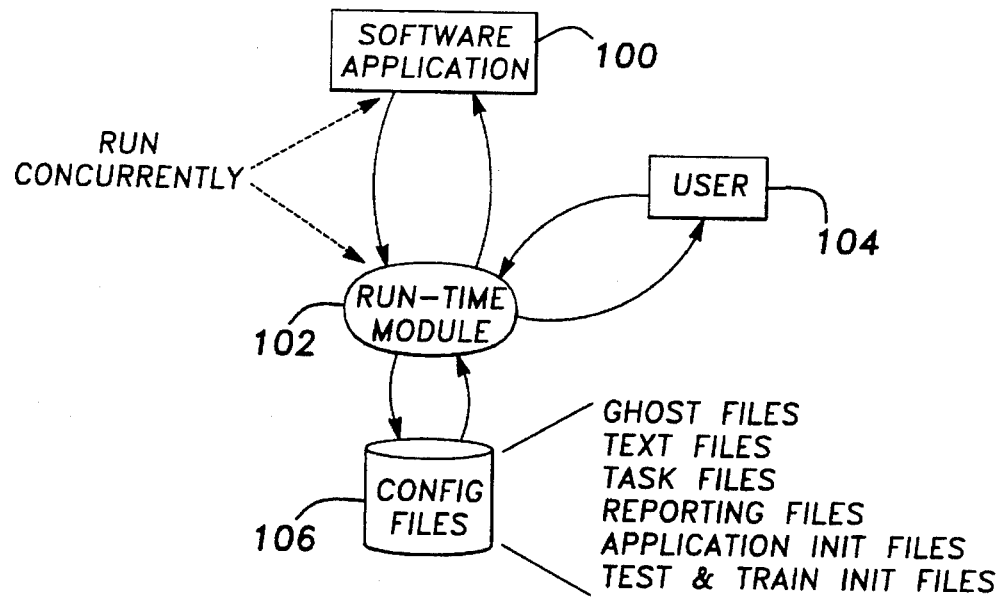
FIG. 6 is a system interface diagram of the presently preferred embodiment.

An overview of the presently preferred embodiment is given in the system interface diagram of FIG. 6. In FIG. 6 the software application that is the subject of the testing and training is depicted at 100. As previously noted, the software application program runs concurrently with the run-time module of the preferred embodiment of the invention, depicted at 102. As illustrated, the software application program 100 and run-time module 102 communicate bi-directionally with one another. The user of this system, depicted at 104, interacts with the run-time module 102 via the keyboard and mouse. Run-time module 102 provides information to the user via the computer screen. This information can include prompts, textually displayed instructional messages, reports, and the like. As will be discussed further below, the run-time module 102 reads and writes a plurality of configuration files, designated generally at 106. These include ghost files for producing key and mouse messages; text files; task files representing data for each task; reporting files to provide reporting templates; application program initialization files; and training and testing (T&T) files.

Figure 7:
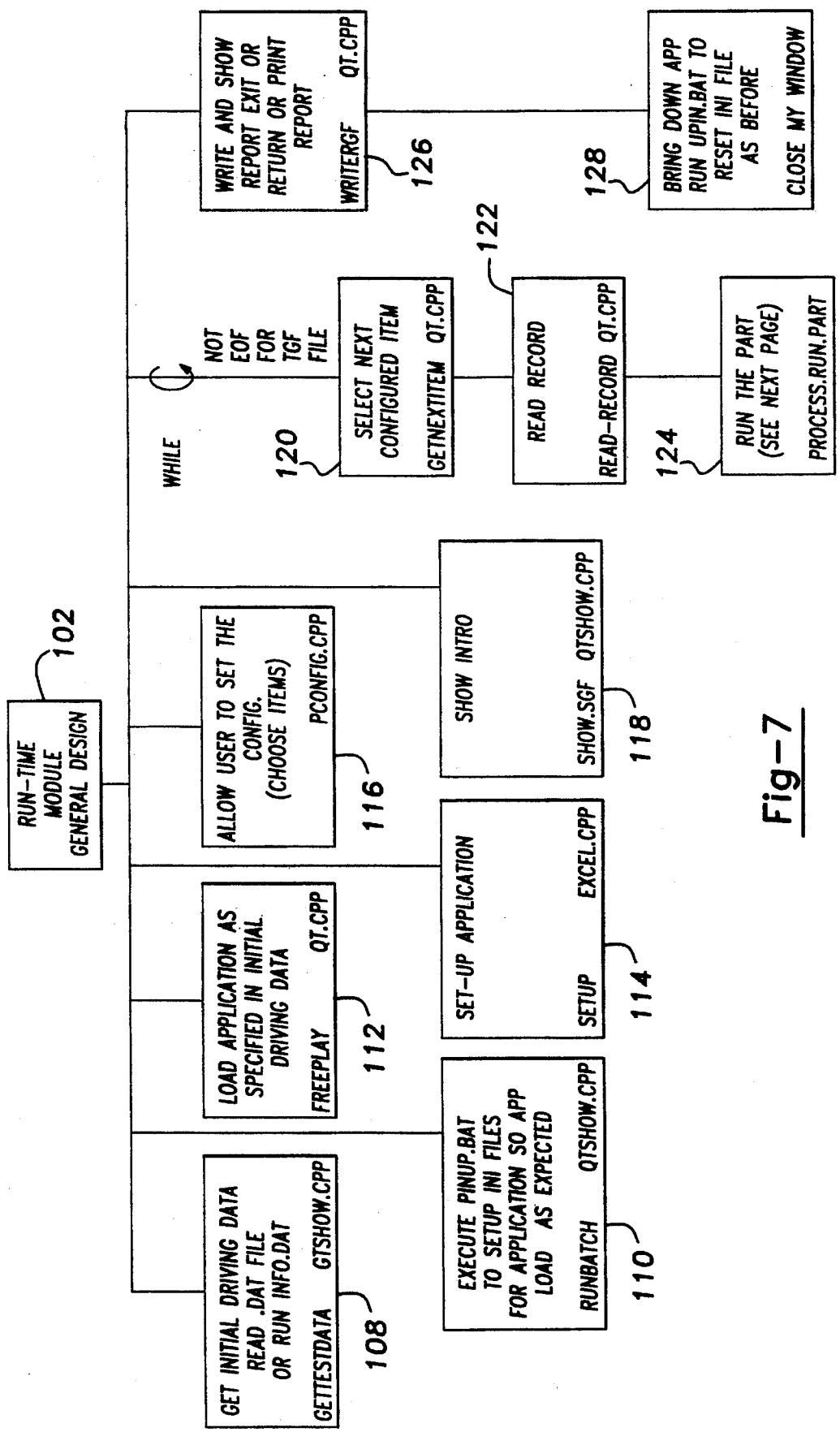
FIG. 7 is a structure diagram of the presently preferred embodiment.

As shown by the structure diagram in FIG. 7, run-time module 102 is, itself, modular by general design. In FIG. 7 the run-time module is depicted as including a plurality of submodules 108–128, inclusive. Generally, the modules are loaded and executed in the order presented from left to right. Module 108 is responsible for reading the initial driving data, that is the initial data that the run-time module needs in order to interface with the software application being tested or trained. Module 110 then executes a batch file that installs the proper initialization files that are required in order for a given software application to load as expected. For example, this may include loading the appropriate INI files for a given Windows application. Module 112 loads the software application for which testing and training is to be performed. Module 112 loads the application according to the initial driving data loaded by module 110. Module 114 then sets up the target software application program by providing it with a string of set-up commands needed to place the application program in the proper mode for performing the desired testing and training. The operations performed by modules 108–114 create a testing and training environment. The environment is created without the need or opportunity for user interaction.

Module 116 allows the user to change the configuration by choosing items which the user wishes to be tested or trained upon. The user does this by interacting with the configuration screen illustrated in FIG. 1. Module 118 displays introductory material designed to instruct the user in participating in the testing and training sequence.

The actual testing and training sequence is performed by modules 120, 122, and 124. These modules execute repeatedly in a WHILE loop until the end of the task generation file (TGF) is reached, signifying that all test questions have been executed, or until the user elects to exit the testing sequence. Module 120 selects the next test item configuration by reading it from a file. Module 122 then reads a record from this file which module 124 then executes to run the selected part of the testing sequence.

Once the tests have been run, module 126 can be called to write and display a report showing the user's test score. Module 128 then closes the software application program in a manner that places the application program in the condition it was in before the run-time module 102 took control. When this has been done, the run-time module then closes its window and exits.

Figure 8:
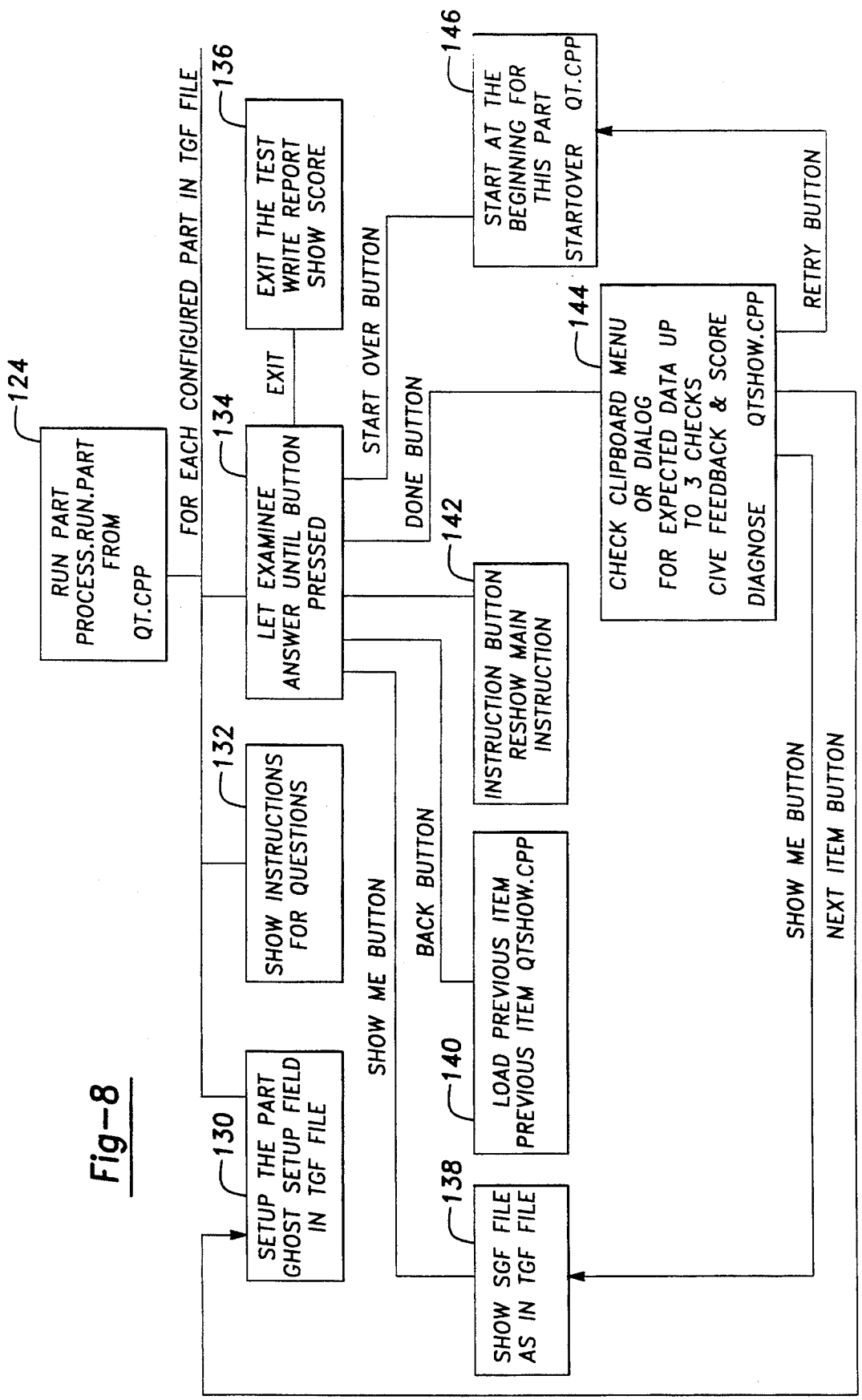
FIG. 8 is a structure diagram of the Run the Part module of the preferred embodiment.

FIG. 8 shows module 124 in greater detail. As illustrated, module 124 is, itself, broken down into a series of submodules. Submodule 130 is responsible for setting up the lesson or part to be tested. This is done by reading the ghost set-up field in the TGF file. The "ghost" information refers to the series of keystroke commands and other instructions that are rapidly provided to the software application program to place it in the proper mode for the desired test part. Module 132 then displays instructions and the test question or questions. Module 134 allows the examinee to respond to the test question. The examinee then presses the Done button, or one of the other buttons on the user interface. These buttons include the Exit button, which calls module 136. Module 136 exits the test portion of the program and writes a report to show the examinee's score. The Done button causes module 144 to execute, as discussed below. The Show-Me button causes module 138 to execute. The Back button causes module 140 to execute, the Instruction button causes module 142 to execute, and the Start-Over button causes module 146 to execute.

Module 138 (the Show-Me module) reads and executes the data in the SGF file corresponding to the file named in the TGF file. In other words, the TGF file contains the name of the appropriate Show-Me SGF file that is loaded and executed by module 138. Note that this file structure associates the Show-Me button response with the given test question being generated.

Module 140 (Back) loads a previous item to cause the test sequence to revert to a previously displayed screen. Module 142 (Instructions) causes the initial system instructions to be re-displayed. Module 144 (Done) gathers information about the actions performed by the user. This information is used to check whether the user has properly or improperly performed the test function and to supply the test score and feedback to the user. The presently preferred embodiment extracts information by examining the contents of the Windows clipboard, by examining the contents of the application program menu resource, and by examining the contents of any dialog boxes, if such constitute part of the operating sequence. In this way, the run-time module, specifically module 144 thereof, is able to determine what keystrokes and mouse operations the user performed in response to the test question. More specifically, module 144 causes any keystrokes entered by the user in the application program to be copied to the clipboard. This is done by executing the appropriate Windows API function call, to cause the application program to copy its text field to the clipboard. Module 144 then examines the contents of the clipboard to grade the test question. In some instances, the user will be required to perform a file operation by accessing the Windows file menu. As a consequence of this operation, some application programs store the file operation under the file menu for later ease in reopening that file. Module 144 interrogates the menu data structure to obtain any information stored in the menu in this way. Finally, some application programs use standard Dialog Boxes to secure input from the user. Module 144 interrogates the Dialog Box in memory to learn what information the user has entered.

The data gathering implementation performed by module 144 is presently preferred because it is easier to implement. In the alternative, module 144 could be constructed to monitor the Windows message queue in order to be made aware of the user's keyboard and mouse data entry operations.

If module 144 determines that the user has incorrectly answered a given question, the user is given several options. One is to press the Show-Me button, which passes control to module 138. Another is to press the Retry button, which passes control to module 146. Module 146 starts over at the beginning of the test part. From module 144 the user can also depress the Next Item button and this passes control back to module 130 where a new test part is set up.

Figure 9:
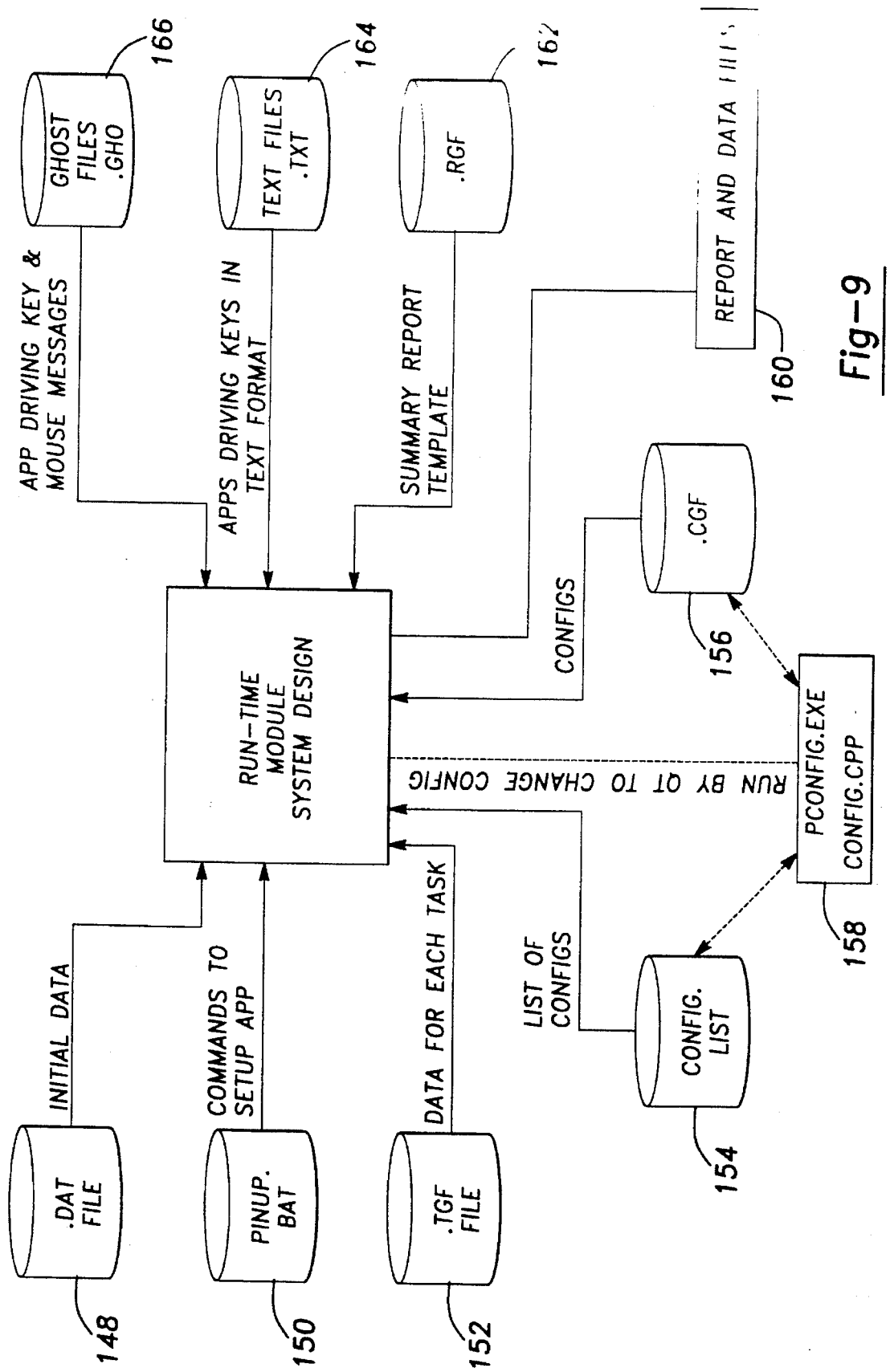
FIG. 9 is a configuration file structure diagram of the preferred embodiment.

As will now be appreciated, run-time module 102 reads and writes a plurality of data files needed for various aspects of the presently preferred implementation. FIG. 9 gives an overview of these files. The initial data is stored in file 148 (designated .DAT file). This is the information used by module 108 (FIG. 7). File 150 is a batch file (PINUP.BAT) used by module 110 (FIG. 7). This batch file is read and executed by the command interpreter of the operating system. It dictates the sequence in which applications are loaded by the operating system. File 152 (.TGF file) stores data for each task. These data include the ghost set-up information used by module 130 (FIG. 8). File 154 (CONFIG.LST) supplies the list of configurations that are available to the run-time module 102. This list can be modified by running the executable program 158 (PCONFIG.EXE). This list defines the list of software applications for which the run-time module is configured to provide testing and training. The list might include, for example, several word processing programs, spreadsheet programs, and the like.

File 156 (.CGF) provides configuration data to module 102. These configuration data correspond to selections made by the user regarding what portions of the program the user wants to be tested and trained upon. Executable program 158 also updates these files. For example, the user may use the configuration screen shown in FIG. 1 to make selections which are then written to file 156.

Run-time module 102 generates reports, an example of which is shown in FIG. 5, and also data files which store the results of the user's tests. These are depicted generally at 160 in FIG. 9. File 162 (.RGF) provides the summary report template used by the run-time module 102 in generating the reports. These templates represent varying degrees of detail for the results of the tests performed.

Text files 164 (.TXT) are provided to supply module 102 with application driving keystrokes in text format. These are used by module 130 during the initial set-up procedure. For example, if the software application must be placed in a certain mode, such as a data entry mode, and if a certain sample text must appear in the main application screen, this information is provided by text files 164. In addition to the text files, the ghost files 166 (.GHO) provide application driving keystroke and mouse messages. These ghost file data are also used by module 130 in setting up the software application program before testing. For example, if certain mouse operations are required to place the application program in condition for testing, mouse message commands are supplied via ghost files 166.

Figure 10A:
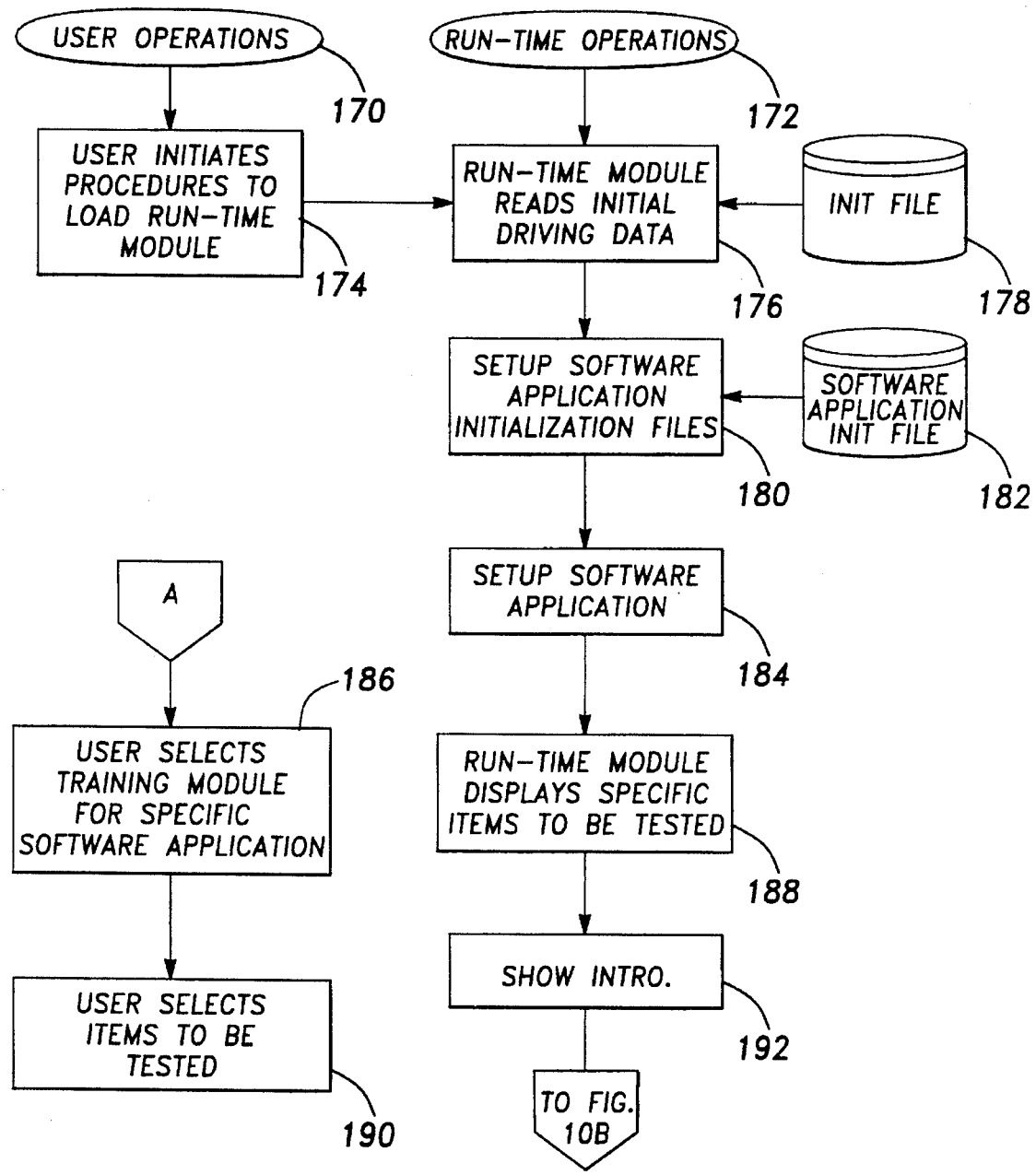
FIG. 10A–10B (collectively FIG. 10) is an operational flowchart showing user operations and corresponding run-time module operations.
Figure 10B:
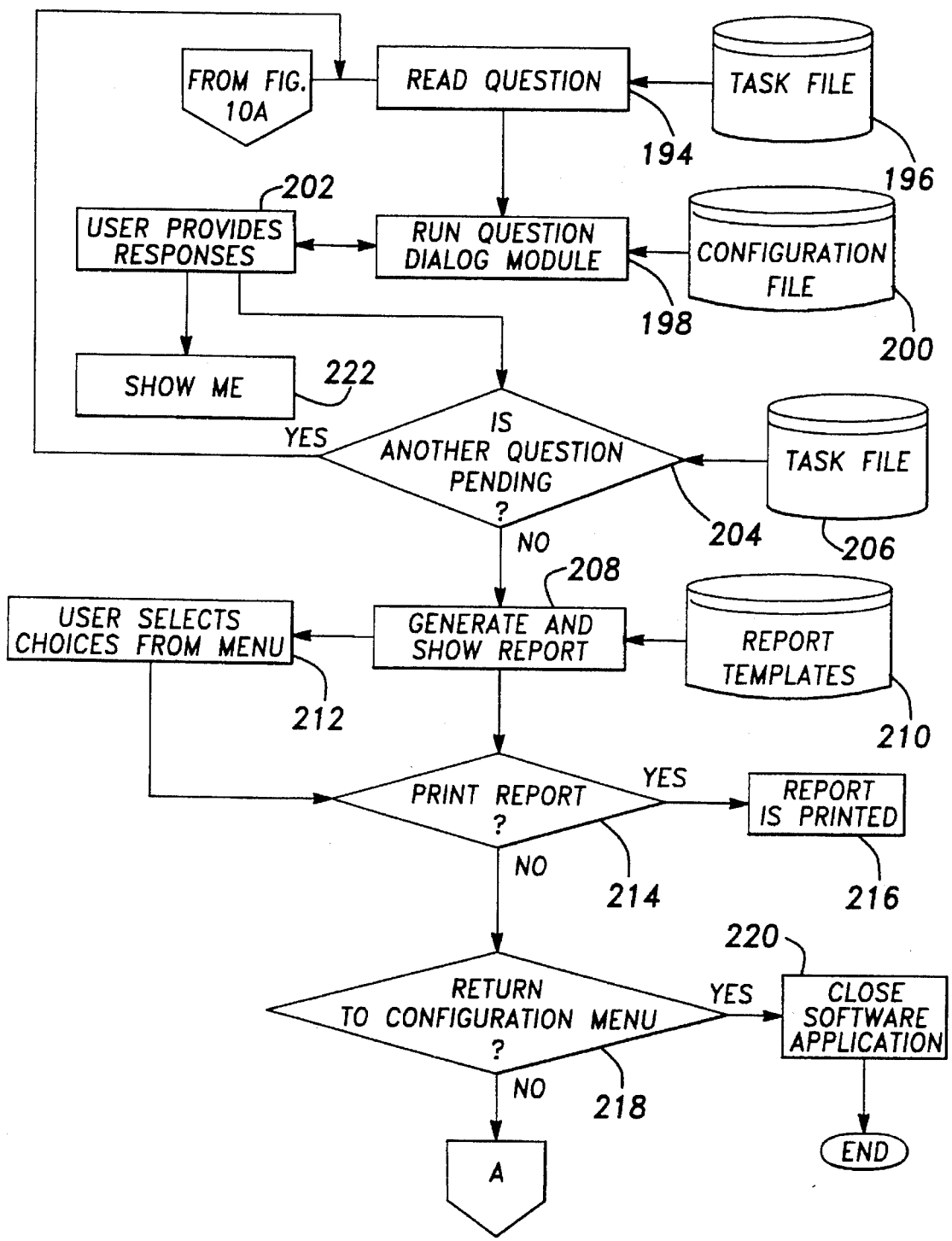

For a further understanding of the operation of the presently preferred testing and training system, refer to FIGS. 10A and 10B. The testing and training system begins by loading the run-time module 102 onto the host computer and then running the software application program 100 concurrently. In FIG. 10A and 10B (collectively FIG. 10), two columns are illustrated: a left-hand column 170 and a right-hand column 172. The left-hand column identifies user-performed operations, and the right-hand column identifies run-time module operations. Beginning in block 174 (column 170), the user initiates procedures to load the testing and training runtime module. The run-time module responds in block 176 (column 172) by reading the initial driving data from the initialization files 178. Then the run-time module, in block 180, runs the appropriate routines to setup the software application program, including reading the application program initiation files 182. Then, in block 184, the software application program is loaded and executed so that it runs concurrently with the testing and training module.

In block 186 (column 170) the user selects a specific software application program for testing and training. The run-time module in block 188 displays a listing of specific topics in which the user may be tested. The user selects the areas to be tested in block 190, where upon the run-time module displays the introductory information, block 192.

Next, in block 194, a test question is read from test file 196 and the run-time module runs its question dialog module, block 198. This module reads various configuration files 200 to produce the question displayed on the screen. The user responds to this question in block 202, providing what he or she believes to be the appropriate response. After this has been done, the run-time module, in block 204, determines whether another question is pending in the task file 206. If so, control branches back to block 194 where the next question is read. If not, control proceeds to block 208 where the run-time module generates and displays a report based on stored reporting templates 210. As depicted at block 212, the user can select several options including printing the report (blocks 214 and 216), returning to the configuration menu (block 218), or closing the application program (block 220).

The Show-Me feature of the invention can be executed by the user in block 202, as depicted by block 222. For details on the presently preferred implementation of the Show-Me feature, see FIG. 11 and the discussion below.

Show-Me files are ASCII files that are created by the author and interpreted by the Show-Me execution module with the primary purpose of alternately displaying text and illustrating how to accomplish a task. The text is preferably displayed in rounded boxes with piped borders. The task is demonstrated by sending a series of mouse actions into the application program at the same speed that those mouse actions were recorded so that the application program behaves as though someone is actually doing the task. The mouse actions are stored in ghost (.gho) files and are recorded by the author.

Show-Me files are executed by the Show-Me execution module which comprises an interpreter, taking commands entered by the author and executing them in the sequence that they appear in the SGF file. FIG. 11 demonstrates this process. First, the name of the SGF file is taken from the TGF file for the item that is being trained as shown in Box 250. Next, the SGF file is read line by line until the end of the file is reached. As each line is read, the command in column 1 is interpreted as shown in Boxes 252 and 254. Most of the available commands are shown in Boxes 256–270. Normally, the first command will be an H (Hide) so that the Please Wait screen hides the application screen while the application is being set up. The next few commands are usually P (Play) commands. This type of command has two parameters: (1) the name of the ghost file to be played, and (2) the speed at which it should be played. The speed relates to how fast the ghost file was recorded. A speed of 1 will be played at the same speed at which the ghost file was recorded. A speed of 25 will be played at 25 times the speed at which it was recorded.

Before creating instruction boxes, the author will typically set up the application by loading an example file. This is accomplished by recording a ghost file that loads the desired file and then entering into the Show-Me file a P (Play) command to play back the ghost file. Since it is desirable for this file to play at a fast rate, the author will normally set the speed to 25 so that it gets played back 25 times as fast as it is recorded. After setting up the application, the author will Unhide the window with the U (Unhide) command. When an author wants to explain what he is about to demonstrate, he uses the O (Open) command followed by Text lines, a G (Get) command, and a C (Close) command. The O command opens the window. The Text lines are then put into the open window and the window is sized to the space that the text requires. The author then issues a G command to wait for user action to indicate that the user is finished reading the box. After the user action (mouse or keyboard), the window is closed with the C (Close) command. After explaining how a task is accomplished, the author will normally want to demonstrate what it looks like when the task is performed in real time. Play commands are also used to demonstrate how to do something within the application. Normally when the author wishes to demonstrate a function, he will do the function in the record mode so that the actions are recorded. He will then enter into the Show-Me file the name of the file that is to be played with a speed of 1 since he wants the file to be played back at the recorded speed. This gives the appearance of doing the task. This process, using text boxes and demonstrating the steps required to perform a task by playing back ghost files, is repeated as designed by the author in a way that appropriately tests and trains the user in the use of the application program.

An exemplary Show-Me file is shown below:

```
H //hide the window
P readymod.gho 25      //play some escapes to close dialogs
P item2dl.gho 25       //play square one to close all children files
U //Unhide the window
B0 //Turn off buttons on bottom of PinPoint Window
0 1 850 933 0 7 1 0 7 _Show_Me154_Press_any_key._154
Open the Window and show text below.
To change the character
formatting of cells:
1)  Select the cell or cells
    by clicking or dragging.
2)  Click on the desired
```

```
      Smarticon:[Bold],[Italic],
         or [Underline].
   Watch as we do it step by
   step
   G??      //Wait for a character or mouse action
   C1       //Close the window.
   P Showhow.gho 1
   X //Jump to here if escape is pressed.
   R //Reset application (close all and reopen child to make sure
   everything is reset).
   E //Exit
```

Figure 12:
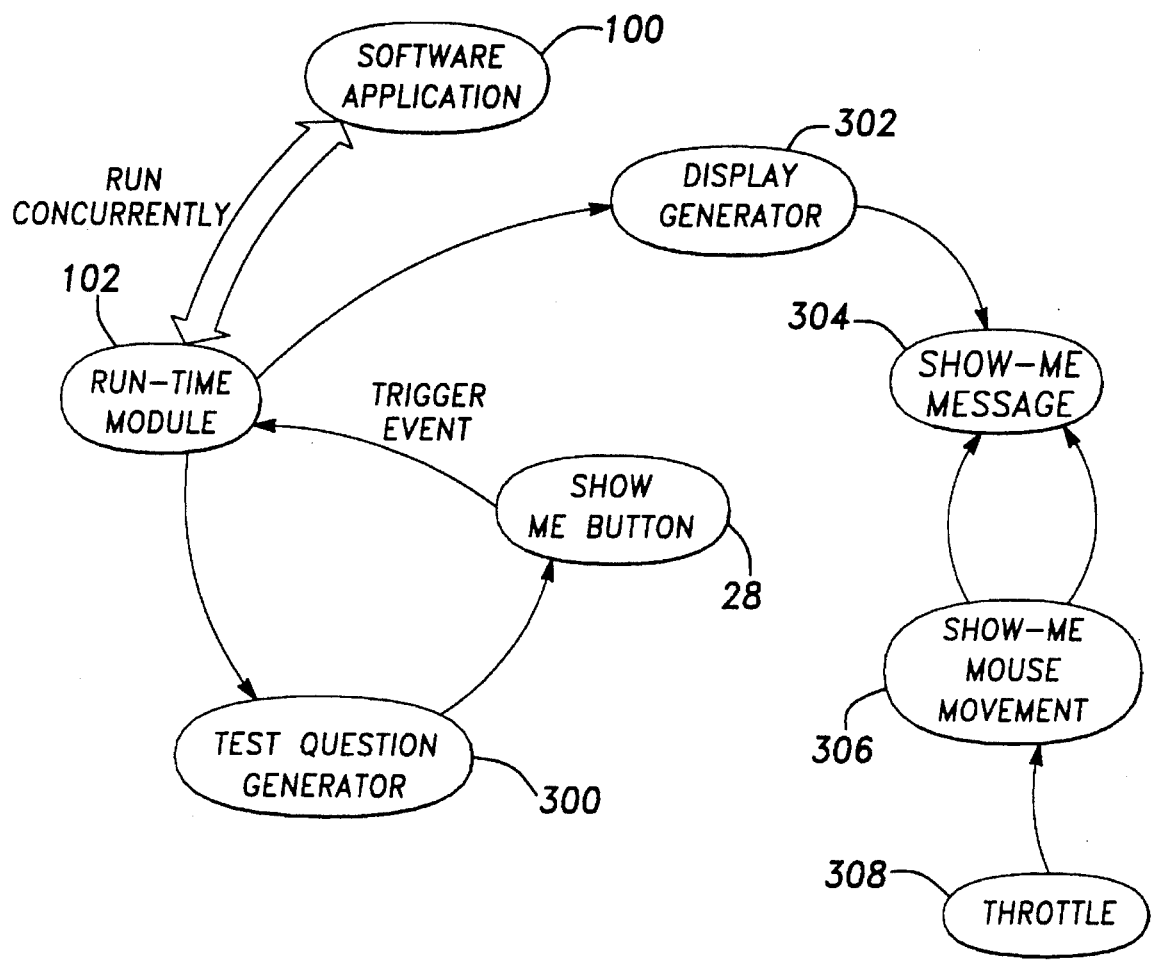
FIG. 12 is an entity relationship diagram showing some of the principals of the invention.

The universal automated training and testing system of the invention will now be summarized with reference to FIG. 12. FIG. 12 is intended to illustrate some of the principles of the invention upon which the presently preferred embodiment of the preceding Figures is based. As noted, the software application program 100 and the run-time module 102 run concurrently. The run-time module has associated with it a test question generator 300 that generates the plurality of textually displayed questions which test the user's skills in using different aspects of the software application program. In the presently preferred embodiment, module 132 displays the test questions. Associated with the test question generator is the Show-Me button 28. The Show-Me button 28 is associated with the run-time module and also with the test question generator. The Show-Me button 28 is actuable by the user to generate a trigger event within the run-time module. In the presently preferred embodiment, the Show-Me button 28 is indirectly associated with the test question generator, in that the function of the Show-Me button is dependent upon what question is currently being tested. This is accomplished by module 138 which establishes the function of the Show-Me button by the contents of the SGF file as named in the TGF file. The run-time module includes a Show-Me message generator 302 that is responsive to the trigger event of the Show-Me button. The display generator produces at least one Show-Me message 304 and at least one Show-Me cursor movement message 306. The Show-Me message 304 is a textually displayed instructional message that is keyed to the message being displayed and instructs the user on how to perform a specified task with the application program. The cursor movement message 306 causes the screen cursor to move to a predetermined location within the application program. It also causes the application program to execute at least one operating step in the application program. The cursor movement message 306 simulates the manner in which a user would normally execute the cursor movement and operating step in actual use of the application program. To effect a natural look and feel, a throttle mechanism 308 is employed. The throttle mechanism controls the rate at which the mouse cursor moves across the screen so as to simulate the manner in which a user would use the mouse in actual use of the application.

Thus, it will be appreciated that the present invention provides an automated testing and training system that is uniquely adapted to effectively and efficiently train and evaluate the proficiency of users of application software programs. Moreover, by sequentially presenting the trainee with various tasks and providing the trainee with opportunities to implement each of the tasks, training is focused on those areas where the trainee is in need of assistance. In particular, if the trainee is at any point unable to properly complete a task, the Show-Me function is available to not only explain how to accomplish the task, but also to visually guide the trainee through the required input commands (i.e., keyboard entries and/or cursor movements). Importantly, because the training program runs concurrently with the software application program, the trainee is not evaluated on only one or two ways of implementing a particular task. In other words, if the trainee successfully accomplishes a given task, the program will proceed to the next task regardless of whether the manner in which the trainee accomplished the task corresponds to the way the procedure would be demonstrated by the Show-Me function. In short, the present training program will "accept" any procedure for accomplishing an assigned task that the application program will accept.

While the invention has been shown and described in its presently preferred form, it will be understood that certain modifications can be made without departing from the spirit of the invention as set forth in the appended claims.

What is claimed is:

1. A universal automated training and testing system for training a user to use a software application program of the type that runs under a window operating system providing windows resources including a clipboard, menu resources and dialog box resources, employing a pointing device-directed screen cursor for testing the user's skills in the software application program comprising:

a run-time module adapted for running concurrently and interactively with the software application program;

a test question generator associated with the run-time module for generating a plurality of textually displayed questions to test the user's skills in using different aspects of the software application program;

said run-time module examines at least one of said windows resources, namely at least one of said clipboard, said menu resources and said dialog box resources, to evaluate the user's responses;

a Show-me button associated with said run-time module and with said test question generator, the Show-me button being actuable by the user to generate a trigger event within said run-time module;

said run-time module including a Show-me display generator responsive to said trigger event, said display generator producing at least one each of the following messages:
   (a) a textually displayed instructional message, keyed to the question being displayed, for informing the user how to perform a task using the software application program; and
   (b) a cursor movement message for causing the screen cursor to move to a predetermined location within the software application and for causing the software application program to execute at least one operating step associated with said task, thereby simulating the manner in which a user executes that cursor movement and operating step in actual use of the software application program.

2. The system of claim 1 wherein said software application includes a menu resource by which the user performs operations and wherein said runtime module examines said menu resource to evaluate the user's response to said textually displayed questions by examining at least some of the operations performed via the software application menu resource.

3. The system of claim 1 wherein said software application includes a clipboard facility through which the user performs cut and paste operations and wherein said runtime module examines said clipboard facility to evaluate the user's response to said textually displayed questions by examining at least some of the operations performed via the clipboard facility.

4. The system of claim 1 wherein said software application includes a dialog box resource through which the user selects options within the software application and wherein said runtime module examines said dialog box resource to evaluate the user's response to said textually displayed questions by examining at least some of the selections made via the dialog box resource.

5. The system of claim 1 wherein said software application runs on an operating system that provides menu resources to said software application by which the user performs operations and wherein said runtime module examines said menu resources to evaluate the user's response to said textually displayed questions by examining at least some of the operations performed via the menu resources.

6. The system of claim 1 wherein said software application runs on an operating system that includes a clipboard facility through which the user performs cut and paste operations and wherein said runtime module examines said clipboard facility to evaluate the user's response to said textually displayed questions by examining at least some of the operations performed via the clipboard facility.

7. The system of claim 1 wherein said software application runs on an operating system that includes dialog box resources through which the user selects options within the software application and wherein said runtime module examines said dialog box resources to evaluate the user's response to said textually displayed questions by examining at least some of the selections made via the dialog box resources.

8. The system of claim 1 wherein said show-me display generator includes a cursor movement throttle for generating a cursor movement message that causes the screen cursor to move to a predetermined location at a predetermined speed.

9. The system of claim 1 further comprising test configuration module for selecting which of a predetermined number of topics are covered by said test question generator.

10. The system of claim 9 wherein said configuration module writes a configuration file that is read by said runtime module and used by said test question generator to select which of said plurality of textually displayed questions are generated during a testing session.

11. The system of claim 1 further comprising scoring module that evaluates the user's response to said textually displayed questions.

12. The system of claim 11 wherein said scoring module evaluates a user's response as either done correctly or incorrectly.

13. The system of claim 11 wherein said scoring module evaluates a user's response as either done correctly or incorrectly without regard to whether the manner the user performs the response corresponds to the manner that is demonstrated by said show-me button.

14. The system of claim 1 wherein said runtime module includes a procedure for causing said software application to be loaded and executed so that the software application runs concurrently with said runtime module.

15. The system of claim 1 wherein said runtime module includes a procedure for initializing said software application so that the software application is placed in a predetermined state before the test question generator displays a textually displayed question.

16. The system of claim 1 further comprising a ghost file containing information from which said cursor movement message are generated and wherein said display generator reads said ghost file and causes the screen cursor to move to a predetermined location based on said information.

17. The system of claim 16 further comprising an authoring system for writing said ghost file in advance of a testing and training session.

18. A method of training a user in the use of a software application of the type that runs under a window operating system providing windows resources including a clipboard, menu resources and dialog box resources, employing a pointing device-directed screen cursor, comprising the steps of:

concurrently loading a runtime module and said software application onto a computer;

causing the computer to place said runtime module and said software application in bidirectional communication with one another;

using said run-time module to generate a plurality of textually displayed questions to test the user's skills in using different aspects of the software application program;

allowing the user to operate the software application in response to said questions and wherein said run-time module examines at least one of said windows resources, namely at least one of said clipboard, said menu resources and said dialog box resources;

using said runtime module to display a user-actuable Show-me button;

in response to actuation of said Show-me button:
(a) generating a textually displayed instructional message, keyed to the question being displayed, for informing the user how to perform a task using the software application program; and
(b) causing the screen cursor to move to a predetermined location within the software application and causing the software application program to execute at least one operating step associated with said aspect of the software application, thereby simulating the manner in which a user executes that cursor movement and operating step in actual use of the software application program.

19. The method of claim 18 further comprising using said runtime module to evaluate the user's response.

20. The method of claim 19 wherein said software application includes a menu resource by which the user performs operations and wherein said runtime module examines said menu resource to evaluate the user's response to said textually displayed questions by examining at least some of the operations performed via the software application menu resource.

21. The method of claim 19 wherein said software application includes a clipboard facility through which the user performs cut and paste operations and wherein said runtime module examines said clipboard facility to evaluate the user's response to said textually displayed questions by examining at least some of the operations performed via the clipboard facility.

22. The method of claim 19 wherein said software application includes a dialog box resource through which the user selects options within the software application and wherein said runtime module examines said dialog box resource to evaluate the user's response to said textually displayed questions by examining at least some of the selections made via the dialog box resource.

23. The method of claim 19 further comprising running said software application on an operating system that provides menu resources to said software application by which the user performs operations and wherein said runtime module examines said menu resources to evaluate the user's response to said textually displayed questions by examining at least some of the operations performed via the menu resources.

24. The method of claim 19 further comprising running said software application on an operating system that includes a clipboard facility through which the user performs cut and paste operations and wherein said runtime module examines said clipboard facility to evaluate the user's response to said textually displayed questions by examining at least some of the operations performed via the clipboard facility.

25. The method of claim 19 further comprising running said software application on an operating system that includes dialog box resources through which the user selects options within the software application and wherein said runtime module examines said dialog box resources to evaluate the user's response to said textually displayed questions by examining at least some of the selections made via the dialog box resources.

26. The method of claim 18 further comprising causing said screen cursor to move to said predetermined location at a predetermined speed.

27. The method of claim 18 further comprising using a configuration module to select which of a predetermined number of topics are covered by said textually displayed questions.

28. The method of claim 27 further comprising using said configuration module to write a configuration file and causing said runtime module to read said configuration file and thereby select which of said plurality of questions are generated during a training session.

29. The method of claim 18 further comprising scoring the user's response to said textually displayed questions.

30. The method of claim 29 wherein said scoring step is performed by evaluating a user's response as either being done correctly or incorrectly.

31. The method of claim 29 wherein said scoring step is performed without regard to whether the manner the user performs the response corresponds to the manner that is demonstrated in response to actuation of the show-me button.

32. The method of claim 18 further comprising using said runtime module to cause said software application to be loaded onto said computer.

33. The method of claim 18 further comprising using said runtime module to cause said software application to be placed in a predetermined initial state before the questions are displayed.

34. The method of claim 18 further comprising writing a ghost file indicative of desired cursor movement and reading said ghost to cause the screen cursor to move in response to actuation of said show-me button.

35. The method of claim 34 further comprising using an authoring system to write said ghost file in advance of a training session.

* * * * *